(12) United States Patent
Pflughaupt et al.

(10) Patent No.: US 9,350,916 B2
(45) Date of Patent: May 24, 2016

(54) INTERLEAVING IMAGE PROCESSING AND IMAGE CAPTURE OPERATIONS

(71) Applicant: Apple Inc., Cupertino, CA (US)

(72) Inventors: Russell Pflughaupt, San Jose, CA (US); Rolf Toft, Palo Alto, CA (US); Paul Hubel, Mountain View, CA (US); Anita Nariani Schulze, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 13/903,671

(22) Filed: May 28, 2013

(65) Prior Publication Data
US 2014/0354842 A1    Dec. 4, 2014

(51) Int. Cl.
*H04N 5/262*    (2006.01)
*H04N 5/232*    (2006.01)
*G06T 5/50*    (2006.01)
*G06T 7/20*    (2006.01)
*H04N 5/235*    (2006.01)

(52) U.S. Cl.
CPC ............... *H04N 5/23267* (2013.01); *G06T 5/50* (2013.01); *G06T 7/2033* (2013.01); *H04N 5/2355* (2013.01); *H04N 5/2356* (2013.01); *G06T 2207/20208* (2013.01); *G06T 2207/20221* (2013.01)

(58) Field of Classification Search
CPC   H04N 5/23267; H04N 5/2355; H04N 5/2356
USPC ............................................. 348/239, 208.1
See application file for complete search history.

(56) References Cited

U.S. PATENT DOCUMENTS

| 5,646,521 | A  | * | 7/1997 | Rosenthal et al. ....... 324/762.02 |
| 5,920,657 | A  |   | 7/1999 | Bender |
| 6,271,847 | B1 |   | 8/2001 | Shum |
| 6,301,440 | B1 |   | 10/2001 | Bolle |
| 6,552,744 | B2 | * | 4/2003 | Chen .......................... 348/218.1 |

(Continued)

FOREIGN PATENT DOCUMENTS

WO          0013407         1/2000

OTHER PUBLICATIONS

Madiha Hussain Malik, et al.: "Wavelet Based Exposure Fusion," Lecture Notes in Engineering and Computer Science, Jul. 2, 2008, pp. 688-693, XP055132823, Retrieved from the Internet: URL: http://www.iaeng.org/publication/WCE2008/WCE2008_pp688-693.pdf [retrieved on Jul. 31, 2014].

(Continued)

*Primary Examiner* — Tuan Ho
*Assistant Examiner* — Zhenzhen Wu
(74) *Attorney, Agent, or Firm* — Blank Rome LLP

(57) ABSTRACT

Systems, methods, and computer readable media to improve image stabilization operations and other image processing operations are described. A novel combination of interleaved image capture and image processing operations, e.g., image registration operations, may be employed on a bracketed capture of still images. Such techniques may result in improved camera performance and processing efficiency, as well as decreased shot-to-shot time intervals. In another embodiment, an image fusion portion of an image post-processing pipeline may also be performed in an interleaved fashion, such that each image in the sequence of obtained bracketed images may be incrementally added to an output composite image after it has been aligned with the preceding image or images from the sequence.

19 Claims, 3 Drawing Sheets

(56) References Cited

U.S. PATENT DOCUMENTS

| | | |
|---|---|---|
| 7,130,864 B2 | 10/2006 | Lin |
| 7,424,218 B2 | 9/2008 | Baudisch |
| 7,602,418 B2 | 10/2009 | Border |
| 7,688,379 B2 | 3/2010 | Forman |
| 7,742,083 B2 | 6/2010 | Fredlund |
| 7,839,429 B2 | 11/2010 | Williams |
| 7,856,120 B2 | 12/2010 | Porikli |
| 7,929,853 B2 | 4/2011 | Park |
| 7,991,196 B2 | 8/2011 | Tener |
| 8,018,999 B2 | 9/2011 | Yao |
| 8,023,000 B2 * | 9/2011 | Tamaru .................... 348/222.1 |
| 8,189,051 B2 | 5/2012 | Shih |
| 8,335,400 B2 | 12/2012 | Kobayashi |
| 8,699,822 B2 * | 4/2014 | Park et al. .................... 382/294 |
| 2005/0228849 A1 | 10/2005 | Zhang |
| 2006/0210166 A1 | 9/2006 | Takemoto |
| 2007/0182861 A1 | 8/2007 | Luo |
| 2008/0037869 A1 | 2/2008 | Zhou |
| 2008/0166115 A1 | 7/2008 | Sachs |
| 2008/0170126 A1 | 7/2008 | Tico |
| 2008/0192129 A1 | 8/2008 | Walker |
| 2009/0115859 A1 | 5/2009 | Lee |
| 2009/0161982 A1 | 6/2009 | Tico |
| 2009/0169102 A1 | 7/2009 | Zhang |
| 2009/0263028 A1 | 10/2009 | Kwon |
| 2010/0017115 A1 | 1/2010 | Gautama |
| 2010/0020224 A1 | 1/2010 | Hattori |
| 2010/0053346 A1 | 3/2010 | Mitsunaga |
| 2010/0165122 A1 | 7/2010 | Castorina |
| 2010/0183225 A1 | 7/2010 | Vantaram |
| 2010/0231593 A1 | 9/2010 | Zhou |
| 2010/0271512 A1 * | 10/2010 | Garten .................... 348/239 |
| 2010/0277609 A1 | 11/2010 | Abe |
| 2011/0038548 A1 | 2/2011 | Rezazadeh |
| 2011/0311147 A1 | 12/2011 | Pahalawatta |
| 2012/0069203 A1 | 3/2012 | Voss |
| 2012/0076427 A1 | 3/2012 | Hibino |
| 2012/0082389 A1 | 4/2012 | Sakamoto |
| 2012/0120283 A1 | 5/2012 | Capata |
| 2012/0121202 A1 | 5/2012 | Wang |
| 2012/0183202 A1 | 7/2012 | Wei |
| 2012/0201427 A1 | 8/2012 | Jasinski |
| 2012/0218427 A1 | 8/2012 | Wu |
| 2012/0249826 A1 | 10/2012 | Kobayashi |
| 2012/0281924 A1 | 11/2012 | Coulombe |
| 2012/0281969 A1 | 11/2012 | Jiang |
| 2012/0293607 A1 | 11/2012 | Bhogal |
| 2012/0300023 A1 | 11/2012 | Lee |
| 2013/0028509 A1 | 1/2013 | Moon |
| 2013/0265451 A1 | 10/2013 | Son |
| 2014/0071299 A1 | 3/2014 | Grundmann |

OTHER PUBLICATIONS

Tico, M. et al.: "Robust Method of Digital Image Stabilization," 3rd International Symposium on Communications, Control and Signal Processing, 2008. ISCCSP 2008, IEEE, Piscataway, NJ, USA, Mar. 12, 2008, pp. 316-321, XP031269886, ISBN: 978-1-244-1687-5.

Luo, Yiwen, and Xiaoou Tang, "Photo and video quality evaluation: Focusing on the subject." Computer Vision-ECCV 2008. Springer Berlin Heidelberg, 2008, 386-399.

Yousefi, Siamak, M. Rahman, and Nasser Kehtarnavaz, "A new autofocus sharpness function for digital and smart-phone cameras." Consumer Electronics, IEEE Transactions on 57.3 (2011): 1003-1009.

* cited by examiner

INTERLEAVING IMAGE PROCESSING AND IMAGE CAPTURE OPERATIONS

BACKGROUND

This disclosure relates generally to the field of digital photography. More particularly, but not by way of limitation, this disclosure relates to still image stabilization techniques and improved processing pipelines therefor. As used herein, image stabilization refers to a collection of techniques for reducing motion-induced blurring during image capture operations. Such motion may result from the movement of the camera, objects in the scene, or both. Further details regarding still image stabilization processes may be found in commonly-assigned U.S. patent application Ser. No. 13/911,873, entitled, "Reference Frame Selection for Still Image Stabilization," which application is hereby incorporated by reference in its entirety. Further details regarding still image stabilization processes may also be found in commonly-assigned U.S. patent application Ser. No. 13/911,793, entitled "Image Registration Methods For Still Image Stabilization," and in commonly-assigned U.S. patent application Ser. No. 13/911,740, entitled "Methods Of Image Fusion For Image Stabilization."

Taking high quality photographs in low ambient light conditions, or photographing dynamic scenes (e.g., sport scenes) is challenging due to camera motion and/or the motion of objects within a scene during image capture. One way to reduce motion blur without amplifying an image's noise is to capture and fuse together multiple, short exposed images of the scene. Such operations are often called 'Still Image Stabilization.' While shortening image exposure times can reduce motion blur artifacts, it does so at the expense of a noisier and/or darker image.

A common approach to image stabilization consists of (1) selecting a reference image from a set of multiple short exposed images, (2) globally registering all non-reference images with the reference image, and (3) synthesizing an output image by fusing all captured images to the reference image. In this way, the output image represents the scene as it was at the time the reference image was captured, where non-reference images are used to reduce the noise in the reference image by averaging/merging multiple observations of each reference pixel across all images. A common approach to selecting the reference image is to base the selection on a quality criterion that is evaluated for each image independently (e.g., image sharpness).

Such an approach to still image stabilization can often be computationally expensive and/or inefficient and lead to undesirable consequences, such as increased shot-to-shot time intervals. Thus, it would be beneficial to provide an improved still image stabilization pipeline that interleaves image processing operations and image capture operations to reduce shot-to-shot time intervals and more efficiently utilize post-processing units.

SUMMARY

In one embodiment, the inventive concept provides a method to more efficiently combine multiple short-exposure images. The method includes obtaining a temporal sequence of images of a scene, and determining an associated capture time of each image. The method may then perform one or more operations to identify relationships between the images during one or more time intervals between the capture times of consecutive images in the sequence of images of the scene. Finally, the method may "fuse" together at least two of the images to generate a composite image of the scene.

In some embodiments, the identified relationships between the images in the obtained sequence of images of the scene may comprise the registration of particular shared features between two or more images in the sequence of images of the scene. In other embodiments, the first image obtained from the obtained sequence of images of the scene may be referred to herein as the "reference frame" or "EV0," and subsequent images may be referred to herein as "Img1," "Img2," "Img3," etc. In still other embodiments, the relationships between an obtained image and the one or more subsequently obtained images from the sequence may be identified during the interval of camera latency before the capture of the next image in the sequence.

Some methods in accordance with this approach include obtaining and storing a (temporal) sequence of 'N' images. Interleaving the above relationship identification (e.g., image registration) steps with the delivery of the N images in a particular sequence or "bracket" of obtained images may shrink the overall amount of time required to perform the relationship identification steps for the sequence, as will be described in further detail below.

In still other embodiments, it is also possible to perform the "fusion" part of the post-processing in an interleaved fashion if the fusion algorithm allows for the incremental addition of each new image after it has been aligned, i.e., registered, with the preceding images from the sequence of obtained images. In this way, the post-processing units are not idle while the sequence or "bracket" of images are being obtained, and early stages of the image post-processing pipeline may be executed during the period of time between image arrivals. In a preferred embodiment, no more than half of the period of time between image arrivals is used for the post-processing steps in order to avoid potentially delaying the capture time of the next image in the sequence.

In one embodiment, each of the above described methods, and variations thereof, may be implemented as a series of computer executable instructions. Such instructions may use any one or more convenient programming languages. Such instructions may be collected into modules and/or programs and stored in any media that is readable and executable by a computer system or other programmable control device.

In still other embodiments, each of the above described methods, and variations thereof, may be implemented by a system comprising an image capture device, a memory, and one or more programmable control devices operable to perform the above described methods as a series of computer executable instructions.

DETAILED DESCRIPTION

Figure 1A:
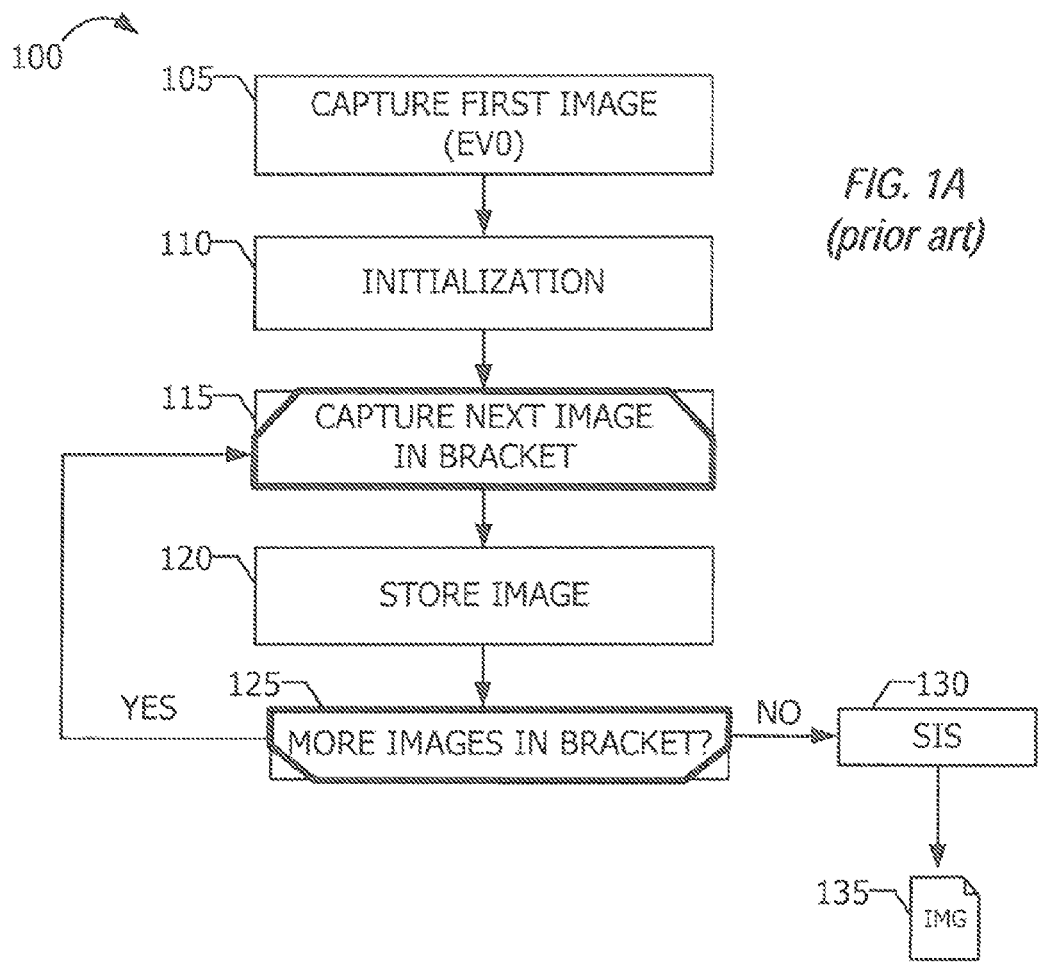
FIG. 1A shows, in flowchart form, an image stabilization operation in accordance with the prior art.

This disclosure pertains to systems, methods, and computer readable media to improve image stabilization operations. In one embodiment, a novel combination of interleaved image capture and image processing operations may be employed, resulting in improved camera performance and processing efficiency, as well as decreased shot-to-shot time intervals. In another embodiment, the image fusion portion of the post-processing pipeline is performed in an interleaved fashion, such that each image may be incrementally added to the output composite image after it has been aligned with the preceding image from the sequence of obtained images.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for hose of ordinary skill in the design an implementation of image stabilization systems having the benefit of this disclosure.

According to one prior art approach to still image stabilization in image processing pipelines, obtaining a bracketed capture of still images is the first step in producing a composite image made from all of the images in the bracket. After the bracket of images has been captured, the images may be handed off to a post-processing system which fuses the images together. The purpose of this fusing could be, e.g., to produce a High Dynamic Range (HDR) image, to produce an image that has been stabilized, or to apply some other image improvement effect. Although increased photo quality is the goal of a bracketed capture with post-processing, one of the detriments is shot-to-shot time intervals.

Referring to FIG. 1A, in one embodiment according to such an approach, still image stabilization operation 100 begins when a first image of the bracketed capture, referred to herein as "EV0," is captured by an image capture device and received by the image processing pipeline (block 105). At that point in time, the EV0 image may be used for initialization purposes related to the image capture process, such as setting the exposure value of the camera to desired levels (block 110). Additional actions that may take place during the initialization sequence include: the pre-allocation of temporary memory buffers to be used during the still image stabilization (SIS) or HDR algorithms; and waking up hardware or software subsystems in preparation for SIS or HDR processing. Next, the subsequent image in the bracketed capture will be captured and received by the image processing pipeline (block 115). As each image in the bracket is capture and received, it may be stored in memory, e.g., volatile or non-volatile memory (block 120). This image capture and storage process will continue so long as there are further images in the bracketed capture (block 125). When all of the images in the bracketed capture have been stored, the still image stabilization (SIS) algorithm may be executed (block 130), resulting in a fused image 135. As mentioned above, the SIS block in the process depicted in FIG. 1A may be substituted for an HDR image creation process or any other image improvement effect that operates on a bracketed capture of images.

Figure 1B:
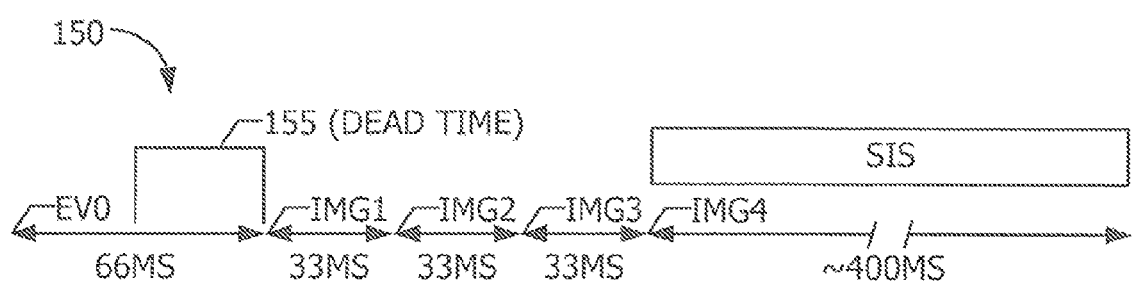
FIG. 1B shows, in timeline form, an image stabilization operation in accordance with the prior art.

Referring now to FIG. 1B, one embodiment of such an image stabilization operation in accordance with the prior art is shown in timeline form 150. Beginning at the left side of timeline 150, the initial reference image, EV0, is captured, followed by an exemplary delay period of 66 ms. A portion of this delay period is labeled, "155 (DEAD TIME)" to indicate that the camera is not capturing further images during this interval and no still image stabilization or other post-processing operations are being performed during this interval. Moving to the right along timeline 150, the next image in the bracketed capture, IMG1, is captured, followed by an exemplary shorter delay period of 33 ms. This process is repeated for the capture of IMG2, IMG3, MG4, and so forth until the desired number of images for the bracketed capture have been captured. The delay period between each of the subsequently captured images in the bracketed capture are also shown as being 33 ms in this example. Moving now to the right side of timeline 150, the still image stabilization process may be executed on each of the bracketed images once all the images have been captured and stored. As discussed above, this process may involve, e.g., globally registering all non-reference images with the reference image, EV0, and generating a composite output image by fusing all captured images to the reference image. As shown in FIG. 1B, this process may take on the order of 400 ms. In other words, this part of the post-processing pipeline may take several times longer than the entire amount of time spent capturing the bracketed images. It is this delay period, among other factors, that may increase the shot-to-shot interval period in prior art image capture and stabilization systems to undesirably high levels.

Figure 2A:
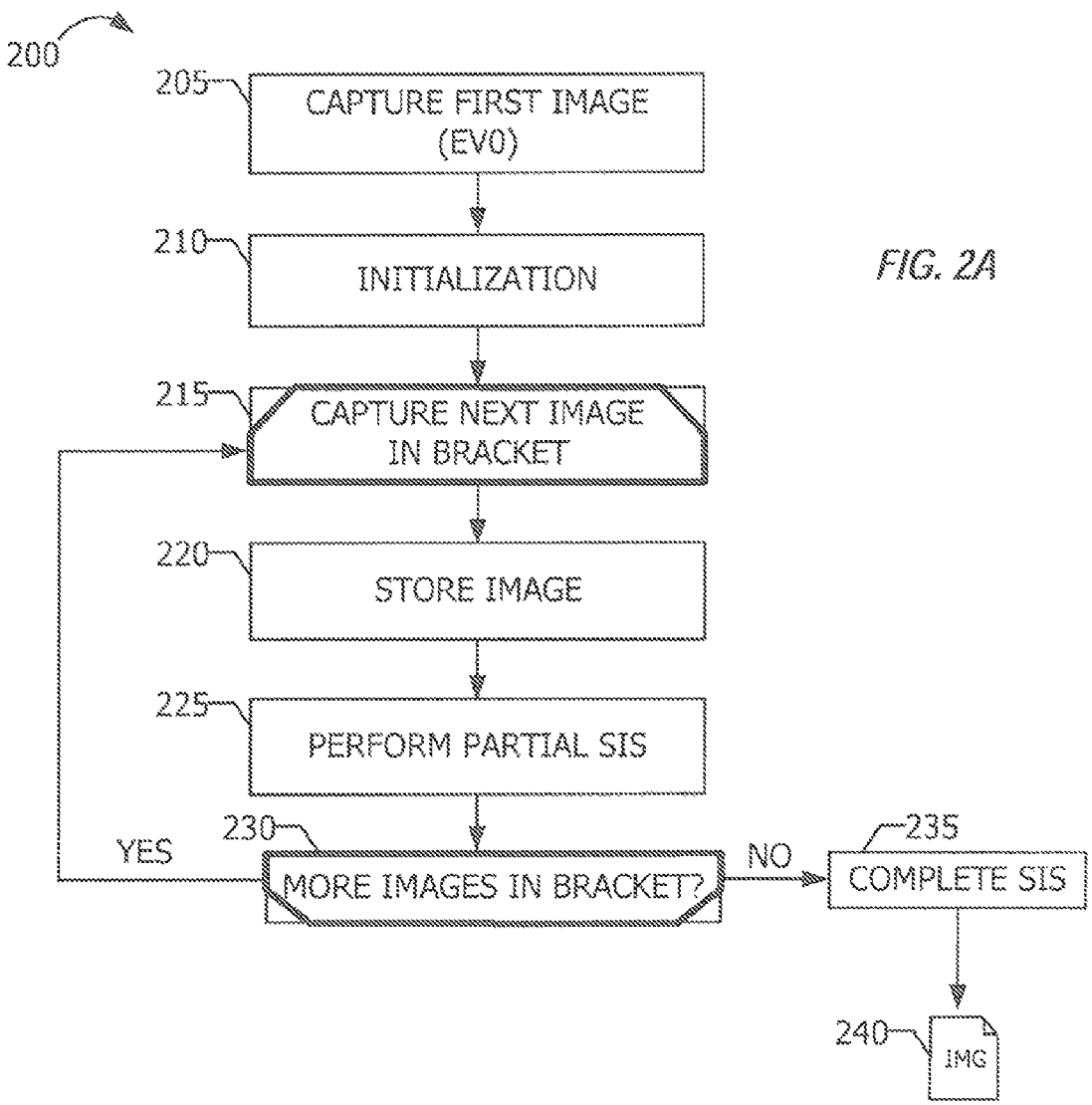
FIG. 2A shows, in flowchart form, an image stabilization operation in accordance with one embodiment.

One novel approach to improving the performance of still image stabilization in image processing pipelines involves "interleaving" certain operations to identify relationships between images in a bracketed capture of still images, i.e., performing such operations during the period of time between image arrivals. Referring to FIG. 2A, in one embodiment according to this novel approach, still image stabilization operation 200 begins when a first image of the bracketed capture, referred to herein as "EV0," is captured by an image capture device and received by the image processing pipeline (block 205). At that point in time, the EV0 image may be used for initialization of the image capture process, such as setting the exposure value of the camera to desired levels (block 210). Next, the subsequent image in the bracketed capture will be captured and received by the image processing pipeline (block 215). As each image in the bracket is capture and received, it may be stored in memory, e.g., volatile or nor volatile memory (block 220).

It is at this point that the novel approach described herein begins to shorten the shot-to-shot interval time of a bracketed capture with post-processing—without any reduction in quality. As may be understood from FIGS. 1A and 1B and the accompanying disclosure, while the bracketed images are being captured in prior art systems, the post-processing units are idle. In other words, after an image 'N' has been captured and delivered, there will be a certain amount of time before the image 'N+1' may be captured and delivered. By breaking the post-processing into a pipeline of stages, as is shown FIGS. 2A and 2B and the accompanying disclosure, the early stages of the post-processing pipeline may be executed during the period between image arrivals, thus providing increased efficiency without sacrificing image quality.

As an example, a typical requirement for a bracketed image capture is to align, or register, all the images to each other. In this way, it is easier to fuse the images together into a final composite. A non-limiting list of exemplary tasks that could be performed by an image registration algorithm include:

1.) Equalizing the color values of an image based upon its color histogram;
2.) Constructing a pyramid (either full or truncated) of progressively smaller images based upon the original image to allow faster image comparisons;
3.) Detecting prominent features (for example, strong corners) within an image or its pyramid;
4.) Matching prominent features between pairs of images to produce a mapping of one image to another; and
5.) Analyzing an image to determine its contribution to the eventual fusion stage of post-processing.

As mentioned above, interleaving the above image registration steps with the delivery of the N images in a particular bracket of obtained images may shrink the overall amount of time required to perform the still image stabilization. As may now be seen from the example shown in FIGS. 2A and 2B, the amount of time required to perform the image registration portion of the still image stabilization process for the sequence may be reduced from being equal to N multiplied by the processing time needed to identify the relationships for each image, i.e., ($N*t_{process}$), down to 1 multiplied by the processing time needed to identify the relationships for each image, i.e., just $t_{process}$. Thus, it may be seen that this approach may have the effect of reducing the overall shot-to-shot time by (N−1) multiplied by the processing time needed to identify the relationships for each image, i.e., by $((N-1)*t_{process})$. In other embodiments, it is also possible to perform the "fusion" part of the post-processing in an interleaved fashion if the fusion algorithm allows for the incremental addition of each new image after it has been registered with the preceding images from the sequence of obtained images, thus potentially further shortening the shot-to-shot interval time.

The steps of image capture, storage, and partial SIS processing (block 225) will continue so long as there are further images in the bracketed capture (block 230). When all of the images in the bracketed capture have been stored and the desired interleaved processing has been completed, any remaining portions of the still image stabilization (SIS) algorithm, e.g., the fusion process, may be executed (block 235), resulting in a fused image 240. As mentioned above, the still image stabilization (SIS) blocks in the process depicted in FIG. 2A may be substituted for an HDR image creation process or any other image improvement effect that operates on a bracketed capture of images.

Figure 2B:
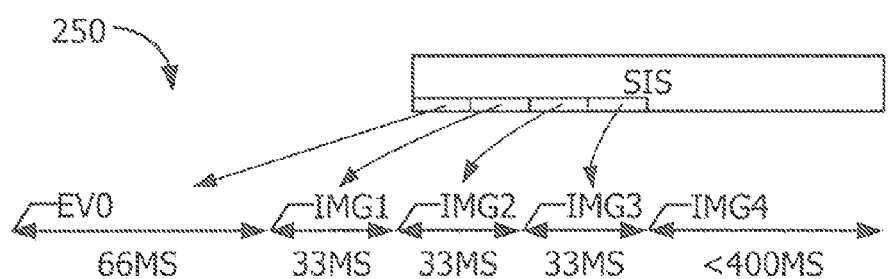
FIG. 2B shows, in timeline form, an image stabilization operation in accordance with one embodiment.

Referring to FIG. 2B, one embodiment of such an image stabilization operation is shown in timeline form 250. Beginning at the left side of timeline 250, the initial reference image, EV0, is captured, followed by an exemplary delay period of 66 ms. During at least a portion of this delay period, at least a portion of the still image stabilization (SS) process is executed. This could include, e.g., initializing camera control parameters and/or hardware and software subsystems that will be used in the capture and processing of the remainder of the bracketed images for the current capture. Moving to the right along time line 250, the next image in the bracketed capture, IMG1, is captured, followed by an exemplary shorter delay period of 33 ms. During at least a portion of this delay period, at least a portion of the still image stabilization (SIS) process is executed. As discussed above, this could include, e.g., identifying and/or matching corresponding features in IMG1 that will allow the process to more quickly register IMG1 with subsequently captured IMG2, equalizing the color values in IMG1, and/or determining IMG1's contribution to the eventual fusion stage of the post-processing. This process is then repeated for the capture of IMG2, IMG3, IMG4, and so forth until the desired number of images for the bracketed capture have been captured. The delay period between each of the subsequently captured images in the bracketed capture are also shown as being 33 ms in this example. During at least a portion of each of these delay periods, the process may likewise attempt to perform at least a portion of the still image stabilization (SIS) process, utilizing the data from the most recently captured image.

Moving now to the right side of timeline 250, any remaining steps involved in the still image stabilization process may be completed once all the images have been captured and stored. As discussed above, this process may involve, e.g., generating a composite output image by fusing all captured images to each other and/or to the reference image. As shown in FIG. 1B, the SIS process took on the order of 400 ms, whereas, in FIG. 2B, the completion of the SIS processing is shown as taking less than 400 ms, due, at least in part, to the interleaved processing that was already performed during the delay periods between the capture of the images in the bracketed sequence. It is this shortened delay period, among other factors, that may lead to a decrease the shot-to-shot interval period as compared to prior art image capture and stabilization systems.

Figure 3:
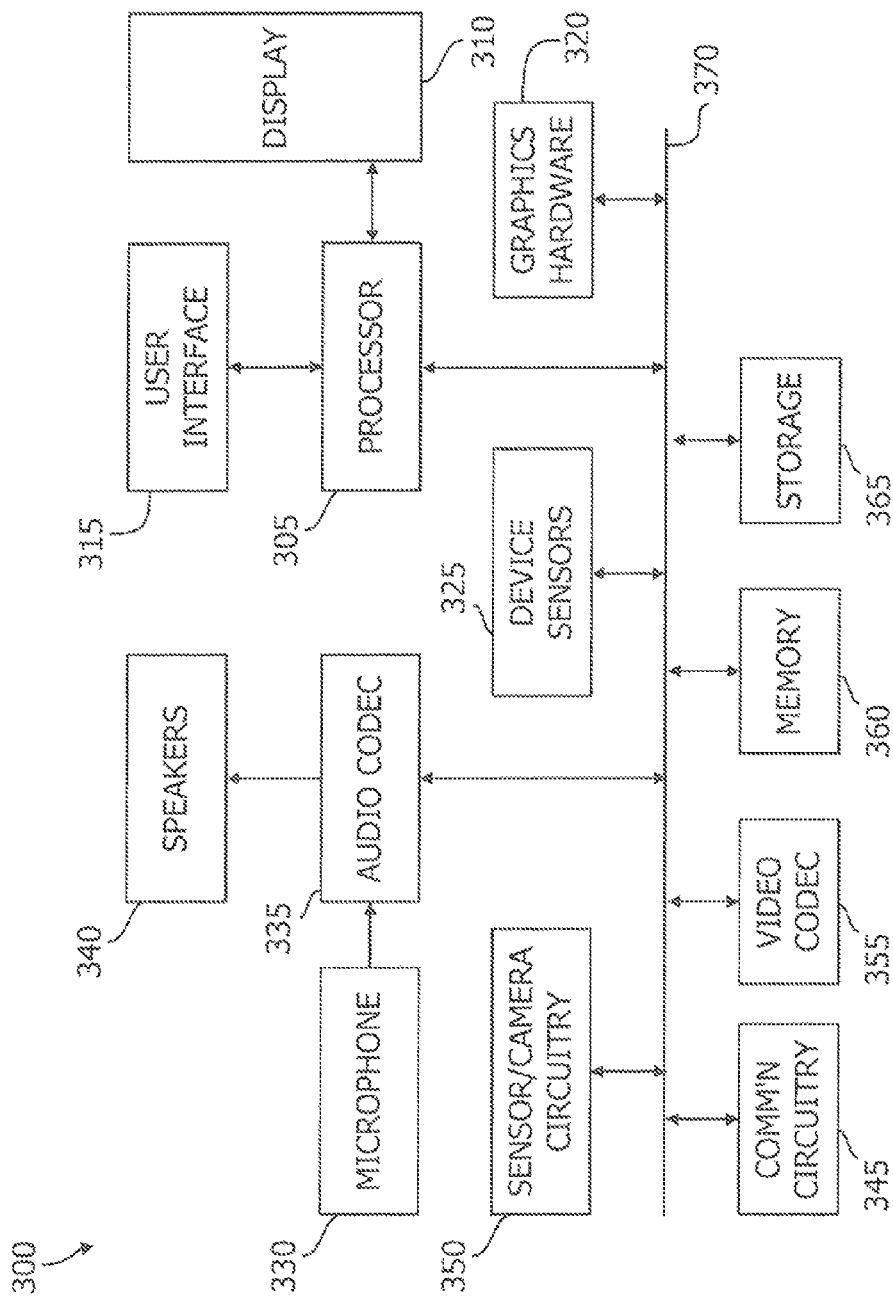
FIG. 3 shows, in block diagram form, a multi-function electronic device in accordance with one embodiment.

Referring to FIG. 3, a simplified functional block diagram of illustrative electronic device 300 is shown according to one embodiment. Electronic device 300 could be, for example, a mobile telephone, personal media device, portable camera, or a tablet, notebook or desktop computer system. As shown, electronic device 300 may include processor 305, display 310, user interface 315, graphics hardware 320, device sensors 325 (e.g., proximity sensor/ambient light sensor, accelerometer and/or gyroscope), microphone 330, audio codec(s) 335, speaker(s) 340, communications circuitry 345, image capture device or circuitry 350, video codec(s) 355, memory 360, storage 365, and communications bus 370.

Processor 305 may be a programmable control device operable to execute instructions necessary to carry out or control the operation of many functions performed by device 300 (e.g., such as the capture and/or processing of images in accordance with FIGS. 2A-2B). Processor 305 may, for instance, drive display 310 and receive user input from user interface 315. User interface 315 can take a variety of forms, such as a button, keypad, dial, a click wheel, keyboard, display screen and/or a touch screen. User interface 315 could, for example, be the conduit through which a user may select when to capture an image. Processor 305 may be a system-on-chip such as those found in mobile devices and include one or more dedicated graphics processing units (GPUs). Processor 305 may be based on reduced instruction-set computer (RISC) or complex instruction-set computer (CISC) architectures or any other suitable architecture and may include one or more processing cores. Graphics hardware 320 may be special purpose computational hardware for processing graphics and/or assisting processor 305 to perform computational tasks. In one embodiment, graphics hardware 320 may include one or more programmable graphics processing units (GPUs).

Image capture device 350 may capture still and video images that may be processed to generate images and may, in accordance with this disclosure, include specialized hardware to perform some or many of the actions described herein. Output from image capture device 350 may be processed (or further processed), at least in part by video codec(s) 355 and/or processor 305 and/or graphics hardware 320, and/or a dedicated image processing unit (not shown). Images so captured may be stored in memory 360 and/or storage 365. Memory 360 may include one or more different types of media used by processor 305, graphics hardware 320, and image capture device 350 to perform device functions. For example, memory 360 may include memory cache, read-only memory (ROM), and/or random access memory (RAM). Storage 365 may store media (e.g., audio, image and video files), computer program instructions or software, preference information, device profile information, and any other suitable data. Storage 365 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 360 and storage 365 may be used to retain computer program instructions or code organized into one or more modules and written in any desired computer programming language. When executed by, for example, processor 305, such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). Image stabilization operations in accordance with this disclosure may be applied to processed versions of the captured images (e.g. edge-maps) or sub-sampled versions of the captured images. In addition, some of the described operations may have their individual steps performed in an order different from, or in conjunction with other steps, that presented herein. More generally, if there is hardware support, some operations described in conjunction with FIGS. 2A-2B may be performed in parallel.

In light of the above examples, the scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause one or more programmable control devices to:
    capture a first and a second image of a temporal sequence of images of a scene, each image having an associated capture time;
    determine, prior to capture of a third image of the temporal sequence of images, a composite image contribution value for the first image and a first relationship between the second and first images;
    capture the third image of the temporal sequence of images;
    determine, prior to capture of a fourth image of the temporal sequence of images, a composite image contribution value for the second image and a second relationship between the third and second images;
    register the first, second and third images based on the first and second relationships; and
    fuse the first, second and third images based on their registration and each image's composite image contribution value.

2. The non-transitory program storage device of claim 1, wherein the instructions to cause the one or more programmable control devices to capture a first, second and third image of a temporal sequence of images of a scene comprise instructions to cause the one or more programmable control devices to obtain a bracketed image capture.

3. The non-transitory program storage device of claim 2, wherein the bracketed image capture is obtained by the one or more programmable control devices from an image capture device that is communicatively coupled to at least one of the one or more programmable control devices.

4. The non-transitory program storage device of claim 2, wherein the bracketed image capture comprises a High Dynamic Range (HDR) image.

5. The non-transitory program storage device of claim 2, wherein the bracketed image capture comprises a stabilized still image.

6. The non-transitory program storage device of claim 1, wherein at least one of the first, second and third images comprises a reference image.

7. The non-transitory program storage device of claim 6, further comprising instructions stored thereon to cause one or more programmable control devices to use the reference image for initialization purposes.

8. The non-transitory program storage device of claim 1, wherein the first and second images comprise consecutively obtained images from the temporal sequence of images.

9. The non-transitory program storage device of claim 1, wherein the instructions to cause the one or more programmable control devices to determine a first relationship between the second and first images comprise instructions to cause the one or more programmable control devices to match corresponding features between second and first images from the temporal sequence of images.

10. A method comprising:
    capturing a first and a second image of a temporal sequence of images of a scene, each image having an associated capture time;
    determining, prior to capture of a third image of the temporal sequence of images, a composite image contribution value for the first image and a first relationship between the second and first images;
    capturing the third image of the temporal sequence of images;
    determining, prior to capture of a fourth image of the temporal sequence of images, a composite image contribution value for the second image and a second relationship between the third and second images;
    registering the first, second and third images based on the first and second relationships; and
    fusing the first, second and third images based on their registration and each image's composite image contribution value.

11. The method of claim 10, wherein capturing a first, second and third image of a temporal sequence of images of a scene comprises obtaining a bracketed image capture.

12. The method of claim 11, wherein the bracketed image capture comprises a plurality of images used to produce a stabilized still image.

13. The method of claim 10, wherein determining a first relationship between the second and first images comprises matching features between the second and first images from the temporal sequence of images.

14. A system comprising:
an image capture device;
memory; and
one or more programmable control devices operable to interact with the image capture device and the memory, and to perform operations comprising:
   capturing a first and a second image of a temporal sequence of images of a scene with the image capture device, each image having an associated capture time;
   determining, prior to capture of a third image of the temporal sequence of images, a composite image contribution value for the first image and a first relationship between the second and first images;
   capturing the third image of the temporal sequence of images;
   determining, prior to capture of a fourth image of the temporal sequence of images, a composite image contribution value for the second image and a second relationship between the third and second images;
   registering the first, second and third images based on the first and second relationships;
   fusing the first, second and third images based on their registration and each image's composite image contribution value; and
   storing the fused image of the scene in the memory.

15. The system of claim 14, wherein capturing a first, second and third image of a temporal sequence of images of a scene comprises obtaining a bracketed image capture.

16. The method of claim 15, further comprising generating a stabilized still image based on the bracketed image capture.

17. the system of claim 14, determining a first relationship between the second and first images comprises equalizing colors of the first image.

18. The system of claim 14, wherein determining a first relationship between the second and first images comprises matching features between the second and first images from the temporal sequence of images.

19. The system of claim 18, wherein determining a first relationship between the second and first images further comprises equalizing colors of the first image.

* * * * *